United States Patent

Vapaakoski et al.

[11] Patent Number: 6,164,547
[45] Date of Patent: *Dec. 26, 2000

[54] METHOD FOR CHECKING THE COMPATIBILITY OF A MOBILE STATION AND A FUNCTIONAL UNIT; A MOBILE STATION AND A FUNCTIONAL UNIT

[75] Inventors: Simo Vapaakoski; Jukka Raisio; Timo Suhonen, all of Tampere, Finland

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,133

[22] Filed: Dec. 16, 1997

[30] Foreign Application Priority Data

Dec. 20, 1996 [FI] Finland .................... 965152

[51] Int. Cl.⁷ .................... G06K 7/16
[52] U.S. Cl. .................... 235/474; 235/476; 455/411; 379/59
[58] Field of Search .................... 235/474, 476, 235/382; 455/406, 411; 379/58, 59, 62

[56] References Cited

U.S. PATENT DOCUMENTS

| | | | |
|---|---|---|---|
| 4,439,670 | 3/1984 | Basset et al. | 235/382 |
| 4,868,846 | 9/1989 | Kemppi | 379/144 |
| 5,091,942 | 2/1992 | Dent | 379/59 |
| 5,266,782 | 11/1993 | Alanara et al. | 235/380 |
| 5,563,934 | 10/1996 | Eda | 235/382 |
| 5,642,401 | 6/1997 | Yahagi | 379/58 |
| 5,754,952 | 5/1998 | Hodges et al. | 379/59 |
| 5,799,084 | 8/1998 | Gallagher et al. | 380/23 |

*Primary Examiner*—Thien M. Le
*Assistant Examiner*—Daniel St. Cyr
*Attorney, Agent, or Firm*—Perman & Green, LLP

[57] ABSTRACT

A method for checking the compatibility of a mobile station (201) and a functional unit (207); a mobile station (201) and a functional unit (207). A reference code (104, 105) is calculated in the mobile station (201) and the functional unit (207) by using algorithms which use initial numbers given by the mobile station (201), and the results are compared in the mobile station (108, 201). On the basis of the comparison it is concluded, whether the functional unit (207) is compatible with the mobile station (201), and whether it is to be activated (110, 112). In order to carry out the check measures, a check message including preferably name of the mobile station manufacturer/agent (302), IMEI code (303), product code (304), version data (305, 306), and random number (307), is transmitted to the functional unit (207). Then a response message including preferably name of the functional unit manufacturer/agent (402), serial number (403), text message indicated by the functional unit (404), version data (405, 406), and reference code (407), is transmitted from the functional unit (207) to the mobile station (201).

15 Claims, 3 Drawing Sheets

METHOD FOR CHECKING THE COMPATIBILITY OF A MOBILE STATION AND A FUNCTIONAL UNIT; A MOBILE STATION AND A FUNCTIONAL UNIT

BACKGROUND OF THE INVENTION

1. Field of the Invention

The present invention refers to a method for checking the compatibility of a mobile station and a functional unit; a mobile station and a functional unit. The functional unit is a part or program to be installed in the mobile station, most preferably a separate device or program which is connected to the mobile station.

2. Description of the Prior Art

Functional units may be connected to present mobile stations for example by accessories, such as computers or PCMCIA (Personal Computer Memory Card International Association) data adapters at least by using electrical cables and IR (Infra Red) transmission paths. For the reasons of cost, the mechanics and accessory connectors are similar in various devices. Thus, it is possible to connect mobile stations and accessories in different systems to each other with cables, although the devices or their applications are not compatible, which results in that the devices, for example mobile station and accessory, do not function as desired, and may be damaged. The user of these devices has to know the compatibility or incompatibility of the functional units.

OBJECTS OF THE INVENTION

It is the object of the present invention to ensure the compatibility and functionability of a mobile station and a functional unit, which is to be installed in it, by making checks to which the functional unit responses. The functional unit may be an application, which is directly added to the mobile station (e.g. a programmably storable application), or an application in a separate device, which is to be connected with the mobile station. The functional unit may also be a software application to be used in a computer, or an application to be used in a data network or a cellular telephone network.

SUMMARY OF THE INVENTION

The characterizing features of the method of the present invention are described in the characterizing part of claim 1. The features of the mobile station of the present invention are described in the characterizing part of claim 6. The features of the functional unit of the present invention are described in the characterizing part of claim 9. The features of the system of the present invention are described in the characterizing part of claim 10. Preferred embodiments of the invention are described in the dependent claims.

Mobile stations have identification codes for the identification of the device. In GSM (Global System for Mobile communications) mobile stations, the identification code is a so-called IMEI code (International Mobile station Equipment Identity) which is determined in GSM 03.03 standard. In the method of the present invention, a reference code is calculated both in the mobile station and the functional unit with the help of a predetermined counting algorithm by using the identification code of the mobile station and a random number, which may be, for example, an exact time. The identification code and the random number are transmitted to the functional unit in a check message, and the reference code is transmitted to the mobile station in a response message. The reference codes are compared in the mobile station, and the comparison is used to determine, whether the functional unit is compatible or not. The counting algorithm is saved to the memory of the mobile station and the functional unit, and it cannot be read from the outside.

An advantage of the invention is that a mobile station, e.g. a mobile telephone, communicator or radio card, checks the properties of the functional unit, such as its type and other necessary data, e.g. HW (HardWare) and SW (SoftWare) versions so that it is possible to know whether the unit is compatible or not, and how the connection is made to the unit. Thus, the mobile station carries automatically out the necessary determinations for a known and supported functional unit, and the user does not have to worry about the functionability of the equipment. The check may also include testing the unit's ability to function. The results are preferably shown to the user for example by signal lights or on the display of the mobile station.

A further advantage of the invention is that using a fixed identification code, e.g. IMEI code, makes it possible to specify the functional unit so that it operates only with the mobile stations identified by a known code. The software of the functional unit can be programmed to include the fixed identification codes of the mobile stations that the functional unit operates with. This serves as an extra confirmation to interoperability in addition with the calculation algorithm included in the functional unit.

Further, it is an advantage of the invention that the reliability of the data transmission between the mobile station and the functional unit is checked.

The present invention is next described referring to the enclosed drawings, in which FIG. 1 is a flow diagram of a method of the present invention for checking the compatibility of the functional unit;

DETAILED DESCRIPTION OF THE PREFERRED EMBODIMENT(S)

Figure 1:
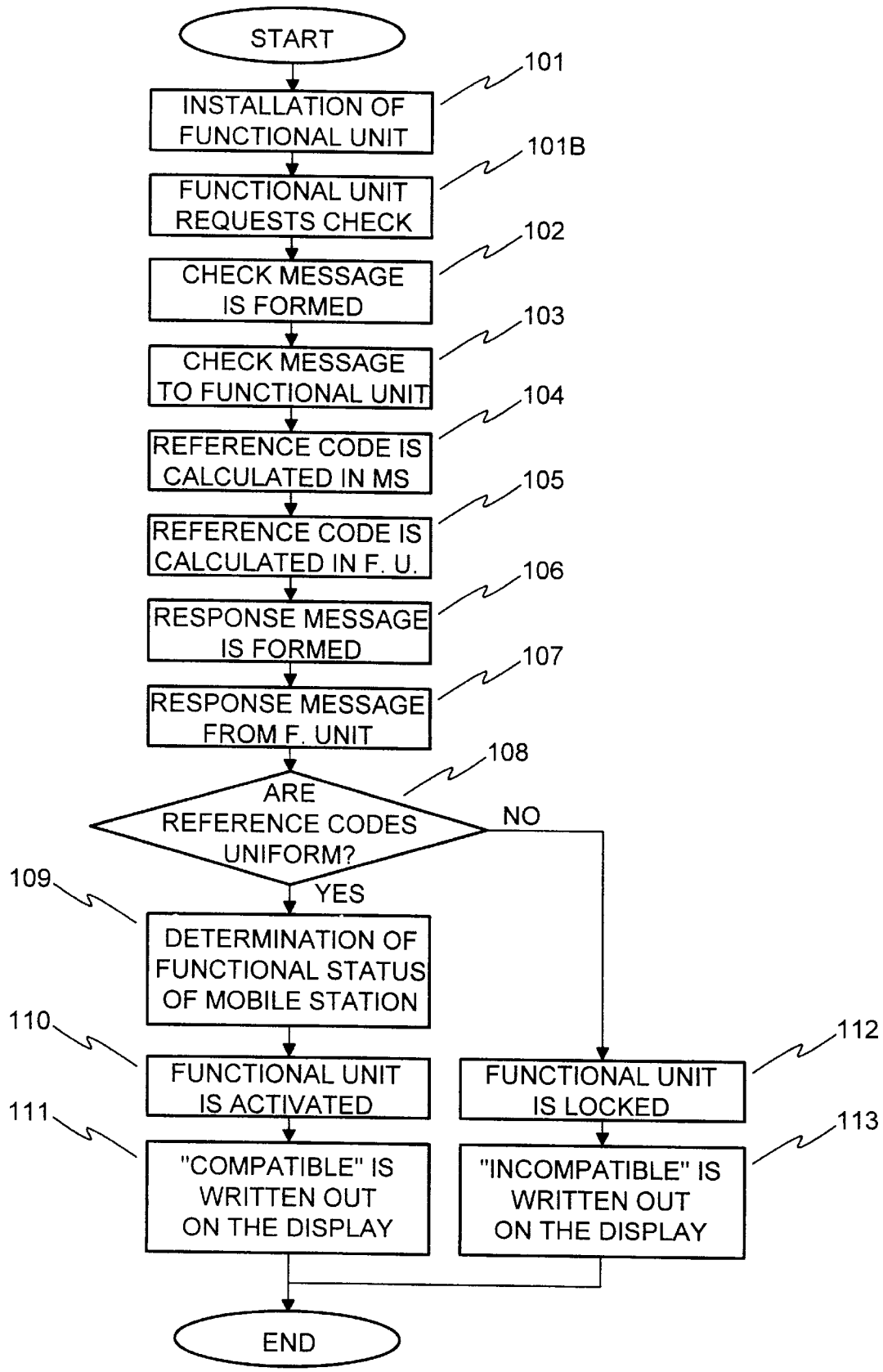

In FIG. 1, there is shown, in form of a flow diagram, a method according to the present invention for checking the compatibility of a functional unit. At stage 101, a functional unit is connected to a mobile station. Preferably the functional unit requests 101B checking from the mobile station when it is connected to the mobile station. Then the mobile station generates a check message 102 that is transmitted to a functional unit 103. A first reference code 104 is calculated in the mobile station. On the basis of the data included in the check message received, the functional unit calculates a second reference code 105. A response message 106 is generated in the functional unit, which includes the said second reference code calculated by the functional unit, and the response message is transmitted from the functional unit 107 to the mobile station. The reference codes calculated in the mobile station and the functional unit are compared in the mobile station 108. On the basis of the comparison, either a positive or a negative decision is made on the compatibility of the functional unit. In a positive case, a functional status suitable for the functional unit is determined 109 in the mobile station, a functional unit 110 is activated, and preferably a message 111 relaying this information is written out on the display of the mobile station. In a negative case, the functional unit, or its interface, is locked 112 in a blocked status, and preferably information 113 is written out that the functional unit is not available.

Figure 2:
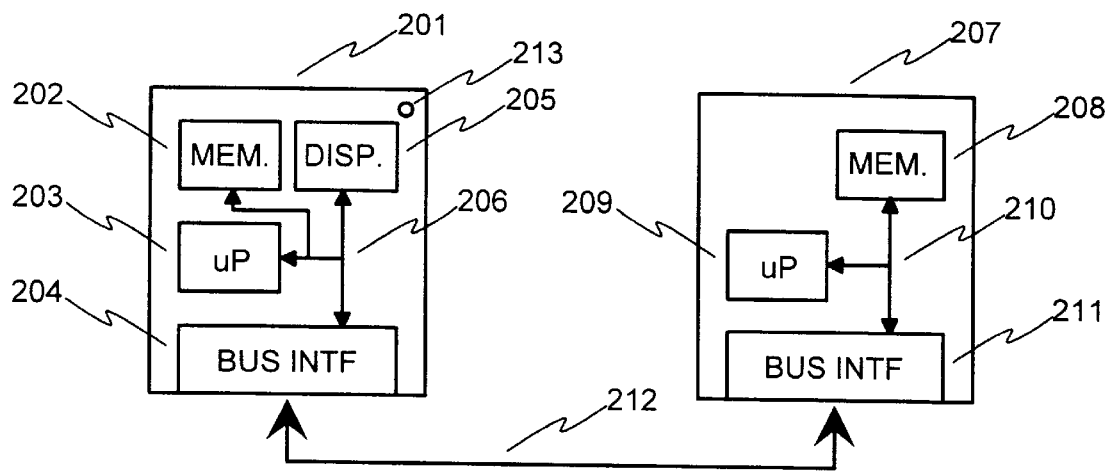
FIG. 2 is a block diagram of the parts of a connection between a mobile station a functional unit that are essential for the invention.

In FIG. 2, there is shown a block diagram of the parts of a mobile station 201 and a functional unit 207 that are essential for the present invention. In this case, the functional unit is an accessory 207 including an application. The mobile station 201 comprises a memory 202, such as Flash and RAM, a microprocessor 203, a bus interface 204, a display equipment 205, and an internal auxiliary circuit bus 206 of the processor. The mobile station also includes optionally a signal light 213, or some other indicator for indicating the compatibility. Memory 202 stores the identification code (IMEI code) for the mobile station, the counting algorithm and necessary parameters, such as the generated random number and the calculated reference code. The microprocessor 203 exchanges data with the other units 202, 204, 205 in the mobile station via the auxiliary circuit bus 206.

The accessory 207 includes a memory 208, such as Flash, a microprocessor 209, an auxiliary circuit bus 210 of the processor, and a bus interface 211. The memory 208 stores e.g. the application the microprocessor is running, and the counting algorithm and necessary parameters, such as the calculated reference code of the accessory. The microprocessor 209 exchanges data with other units 208, 211 within the accessory via the auxiliary bus interface 210. In case a functional unit is to be added to the mobile station, the functional unit is stored to the memory 202 of the mobile station, and no connection to an external accessory is needed.

The interface bus 212 between a mobile station and an accessory is realized e.g. by an electric cable or IR (InfraRed) light. In case of a functional unit to be stored within the mobile station, the interface bus 212 may, for example, be placed on a circuit card, or it may be an internal conductor within an integrated circuit.

Next it is described, how the mobile station 201 and the accessory 207 are connected to each other. When connecting the interface bus 212 of the accessory to the bus interface 204 of the mobile station, preferably the processor 209 of the accessory detects a connection and the accessory 207 transmits a request to check the accessory to the mobile station. Then the check of the accessory 207 is to be started. The processor 203 of the mobile station generates a check message which is transmitted to the accessory 207 via the bus interface 205 and the interface bus 212. The processor 203 of the mobile station calculates the first reference code by using the counting algorithm and the identification code such as the mobile station unique IMEI code.

The accessory 207 receives the check message from the interface bus 212 to the bus interface 211. From the bus interface 211, the check message is transmitted to the microprocessor 209. The microprocessor 209 retrieves the counting algorithm from the memory 208, and calculates a second reference code on the basis of the information in the check message. The microprocessor 209 forms a response message containing the second reference code, and transmits it via the bus interface 211 and the interface bus 212 to the mobile station 201.

The microprocessor 203 of the mobile station receives the response message coming from the interface bus 212 via the bus interface 204. The first and the second reference code, received from the accessory, are compared in the microprocessor 203. On the basis of the comparison, it is concluded, whether the accessory 207 is compatible with the mobile station 201. In a positive case of compatibility, the bus interface 204 in the mobile station is set to a state of standby corresponding with the accessory 207. The state of standby means, for example, the selection of the data transmission protocol and user connection and opening the interface. On the display 205, there is shown a statement about compatibility. In an opposite case, the display 205 shows a statement about incompatibility.

In some cases, the functional unit is a program. The functional unit is installed to the mobile station 201. Typically, the program is first in form of a data package, which is transferred to the memory 202 of the mobile station 201. The data package is checked in the mobile station 201 according to, for example, public and secret key. The check may be carried out, for example, by using a PGP (Pretty Good Privacy) method based on the RSA (Rivesti-Shamir-Aldeman) algorithm. Thus it is checked that the data package is of a correct type. The processor 203 of the mobile station provides the data package with a code, which it compares with a code of an allowed data package it possesses. In case the codes are uniform, unloading of the data in the data package and its installation in the mobile station 201 are allowed.

After the program has been installed, the processor 203 of the mobile station runs the original check program from the memory 202 and generates a check message, which is transferred logically to the new installed program. The processor 203 of the mobile station calculates the first reference code on the basis of its own original data.

Then the same processor 203 calculates a second reference code by using the algorithm of the new loaded program, and forms a response message, which it transmits logically to the check program. The algorithm of the installed program is most preferably done so that it functions only in connection with a certain mobile station. The identification code of the mobile station is used for this purpose.

The original check program of the mobile station 201 receives the response message and compares the first reference code it calculated with the second reference code calculated by the functional unit. On the basis of the comparison it is decided, whether the functional unit is compatible with the mobile station 201. In case the functional unit is compatible with the mobile station 201, a logical approval is set to the running of the program. The display 205 shows a statement about compatibility. In an opposite case, the display 205 shows a statement about incompatibility.

Besides checking the compatibility, the mobile station 201 informs, when necessary, and preferably by using the SMS (Service Management System), the code of the mobile station and the installed program to the server of the program manufacturer. Then the said server registers the program in question to the mobile station.

Next there is shown an alternative way to activate and register the program. Here the check message is transmitted from the mobile station 201 to the server of the manufacturer of the program to be installed, the server also calculating the second reference code. The SMS Service Management System is preferably used for the transmission. The first reference code may be calculated in the mobile station 201 by using its original counting algorithm, or a counting algorithm included for the program. The said server generates a response message, which is transmitted to the mobile station 201. The mobile station 201 compares the reference codes and decides on the activation of the program, as described above. After the possible activation, the said server registers the program in question to the mobile station.

Figure 3:
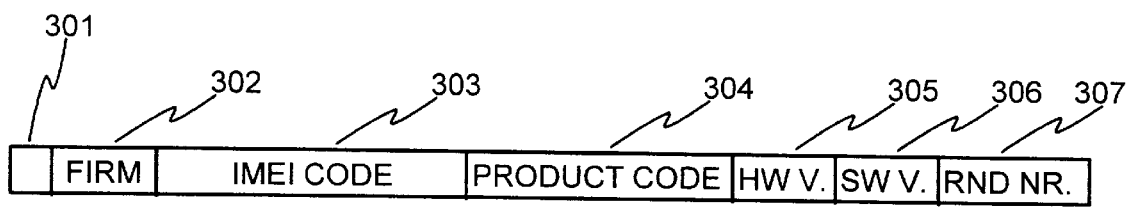
FIG. 3 shows the contents of a check message within a time line.

In FIG. 3, there is shown an example of a check message the processor 203 generates on the basis of data included in the memory 202. The message includes in one or more bytes message code 301, name of the mobile station manufacturer/agent 302, e.g. "FIRM", IMEI code 303, product code 304, hardware version 305, software version 306, and random number 307.

Figure 4:
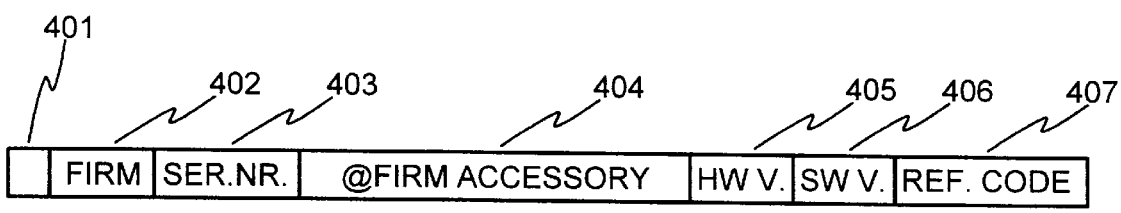
FIG. 4 shows the contents of a response message within a time line.

In FIG. 4, there is shown an example of a response message the processor 209 generates on the basis of data included in the memory 208. The message includes message code 401, name of the accessory manufacturer/agent 402, serial number of the accessory 403, text possibly shown on the display of the mobile station 404, e.g. "@FIRMA accessory", hardware version 405, software version 406, and reference code 407.

Figure 5:
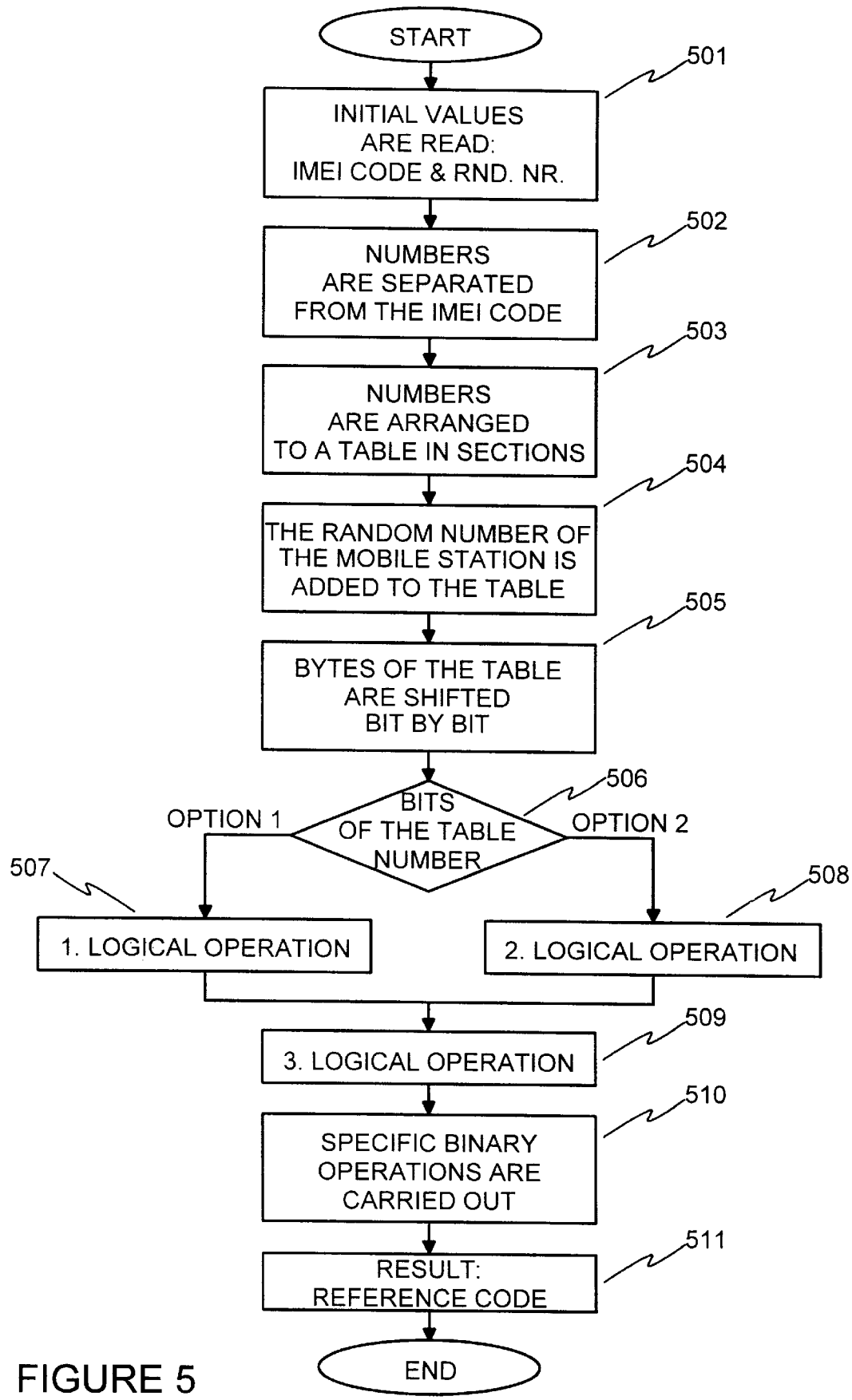
FIG. 5 is a flow diagram of an example of a counting algorithm for a reference code.

In FIG. 5, there is shown as an example a flow diagram of a counting algorithm for a reference code. First 501, the initial values of the algorithm are read: the IMEI code and the random number. The mobile station keeps an IMEI code which is unique for every mobile station, and forms a random number, so that these are locally available. The accessory receives these initial values in the check message. At the phase 502, all or certain set numbers are separated for use from the IMEI code. The numbers separated for use are divided into groups, which are arranged to a table at 503. The random number formed in the mobile station is added to the table at 504. A set number of bytes is transmitted bit by bit 505 to a set direction, for example on the basis of a number determined by two bits.

The next operation is dependent on e.g. one or two bits of a certain number in the table at 506 so that these bits are used to determine, whether a first logical operation according to phase 507, or a second logical operation according to phase 508, is carried out to a set block of the table. The second number of the logical operation to be carried out is the above-mentioned number in the random number; it again is determined according to whichever operation (507 or 508) will be carried out. The starting point of the table block, which is the object of the operation, is determined by the number in the random number. The result of the logical operation is transferred to the location, from where the first numbers of the operation were taken.

At 509, a third logical operation is carried out among all the numbers of the table; they produce an intermediate result, which is saved. Finally, at 510, specific binary operations are run between the table numbers and the said intermediate result, which results in the final result in form of a key number, 511.

The check message formed in the mobile station includes, according to FIG. 3, i.a. name of the mobile station manufacturer/agent 302, IMEI code 303, product code 304, version data 305, 306, and random number 307. The check message formed in the accessory includes according to FIG. 4 i.a. name of the accessory manufacturer/agent 402, serial number 403, text 404 shown on the display of the mobile station, version data 405, 406, and reference code 407 calculated by the counting algorithm.

Some embodiments of the invention are described above. Naturally, the present invention is not limited to these examples, but the principle of the invention may be varied within the scope and spirit of the invention, for example on the part of the details and field of application of the realization.

For example, the functional unit may be a data card, but also any other functional unit capable of data processing may be controlled by using the method of the invention. For example, a data conversion application for sending data wirelessly may be included in the data card, or it may be directly loaded to the computer, which is connected with the mobile station. The functional unit may also be a part of the mobile station.

The counting algorithm may be any algorithm, which preferably takes into account the initial parameters, and gives a reference code as a result. So that own reference codes can be generated by different equipment combinations, it is preferred for the algorithm to be multi-phase, or otherwise of a type enabling the reference code to achieve a large amount of different values. Most preferably, the functional unit uses the same counting algorithm as the mobile station.

The check and response messages exchanged by the mobile station and the functional unit may also include other information, for example the type of the mobile telephone system and the functional unit, and the serial numbers for the equipment.

What is claimed is:

1. A method for checking compatibility between a mobile station and a functional unit connected to the mobile station, comprising the steps of:

generating, in the mobile station, a check message which comprises a code unique to the mobile station;

transmitting the check message from the mobile station to the functional unit;

calculating a first reference code in the mobile station based on said unique code for the mobile station and a predetermined algorithm;

calculating a second reference code in the functional unit based on said unique code for the mobile station in the check message and said predetermined algorithm;

generating a response message comprising the second reference code in the functional unit;

transmitting the response message to the mobile station;

retrieving the second reference code from the response message in the mobile station;

comparing, in the mobile station, the first and second reference codes; and determining compatibility between the mobile station and the functional unit based on the comparison of the reference codes.

2. The method according to claim 1, wherein the check message of the mobile station further comprises a random number.

3. The method according to claim 1, wherein the unique code of the mobile station comprises an International Mobile Equipment Identifier code.

4. The method according to claim 1, wherein, based on the compatibility determined, the mobile station is set to a state of standby required by the functional unit for the use of the functional unit with the mobile station.

5. A mobile station having an associated functional unit and means for connecting said functional unit thereto, and having a unique code distinguishing the mobile station from other mobile stations, said mobile station comprising:

means for generating a first reference code based on the mobile station unique code and a predetermined algorithm, and for generating a check message which comprises the mobile station unique code for the functional unit;

data transmission means for transmitting the check message to the functional unit;

means for receiving from the functional unit a response message comprising a second reference code indicative of compatibility of said mobile station and said functional unit;

means for reading the second reference code from the response message; and means for comparing, in the mobile station, the first and second reference codes for determining compatibility between said mobile station and said functional unit.

6. A mobile station according to claim 5, further comprising means for setting the mobile station to a state of standby in response to determining compatibility for the use of the functional unit with the mobile unit.

7. A mobile station according to claim 5, wherein the check message of the mobile station further comprises a random number.

8. A mobile station according to claim 5, wherein the unique code of the mobile station comprises an International Mobile Equipment Identifier code.

9. A functional unit which is associated with and having means for connecting to a mobile station, comprising:

means for receiving a check message from the mobile station including a unique code distinguishing the mobile station from other mobile stations;

means for generating a reference code indicative of compatibility of said functional unit and said mobile station based on the unique code in the check message;

means for generating a response message based on said reference code; and means for transmitting the response message to the mobile station for determining, in the mobile station, compatibility between the functional unit and the mobile station based on said reference code.

10. A functional unit according to claim 9, wherein the check message of the mobile station further comprises a random number.

11. A functional unit according to claim 9, wherein the unique code of the mobile station comprises an International Mobile Equipment Identifier code.

12. A system comprising a mobile station having a code unique thereto and an associated functional unit and means for connecting said mobile station to said functional unit, wherein said mobile station comprises:

means for generating a first reference code and a check message;

means for transmitting said check message to said functional unit;

means for receiving a second reference code from said functional unit; and means for comparing, in the mobile station, the first and second reference codes to determine compatibility between the functional unit and the mobile station; and wherein the functional unit comprises:

means for receiving the check message from the mobile station;

means for generating said second reference code based on the check message;

means for generating a response message based on said second reference code; and means for transmitting the response message to the mobile station for the determination of compatibility between the functional unit and the mobile station.

13. A system according to claim 12, wherein the check message comprises a random number and a unique code of the mobile station.

14. A system according to claim 13, wherein the unique code of the mobile station comprises an International Mobile Equipment Identifier code.

15. A system according to claim 12, further comprising means for setting the mobile station to a state of standby in response to determining compatibility for the use of the functional unit with the mobile unit.

* * * * *